United States Patent
Sarlashkar et al.

(10) Patent No.: US 7,562,649 B2
(45) Date of Patent: Jul. 21, 2009

(54) COMBUSTION CONTROL SYSTEM BASED ON IN-CYLINDER CONDITION

(75) Inventors: Jayant V. Sarlashkar, San Antonio, TX (US); Shizuo Sasaki, San Antonio, TX (US); Gary D. Neely, San Antonio, TX (US)

(73) Assignee: Southwest Research Institute, San Anotonio, TX (US)

( * ) Notice: Subject to any disclaimer, the term of this patent is extended or adjusted under 35 U.S.C. 154(b) by 0 days.

(21) Appl. No.: 11/773,784

(22) Filed: Jul. 5, 2007

(65) Prior Publication Data

US 2009/0007888 A1 Jan. 8, 2009

(51) Int. Cl.
*F02D 41/30* (2006.01)

(52) U.S. Cl. .............. 123/478; 701/103; 701/108; 701/109

(58) Field of Classification Search .......... 123/434–6, 123/672, 674, 676, 679, 685, 686, 704, 472, 123/478, 568.11, 568.21, 568.22, 486, 480, 123/501, 502, 446, 357–9, 500, 370, 371, 123/675, 677, 681–4; 701/103, 108, 109
See application file for complete search history.

(56) References Cited

U.S. PATENT DOCUMENTS

| 4,134,549 | A |   | 1/1979 | Perr ..................... 239/92 |
| 4,276,600 | A |   | 6/1981 | Hartford et al. ......... 364/431 |
| 4,493,303 | A |   | 1/1985 | Thompson et al. ........ 123/357 |
| 4,580,539 | A | * | 4/1986 | Kitahara ................. 123/686 |
| 4,825,837 | A |   | 5/1989 | Nakagawa .............. 123/489 |
| 4,881,509 | A | * | 11/1989 | Ohashi et al. .......... 123/406.48 |
| 5,190,008 | A | * | 3/1993 | Yamasaki et al. ........... 123/306 |
| 5,239,974 | A |   | 8/1993 | Ebinger et al. ............. 123/675 |
| 5,363,826 | A | * | 11/1994 | Takaoka ................. 123/486 |
| 5,642,709 | A | * | 7/1997 | Ozaki et al. .............. 123/361 |
| 5,680,842 | A |   | 10/1997 | Schmid ................... 123/357 |
| 5,749,346 | A |   | 5/1998 | Halvorson et al. ......... 123/486 |
| 5,931,136 | A | * | 8/1999 | Isobe et al. ............... 123/399 |
| 5,934,249 | A |   | 8/1999 | Nanba et al. .............. 123/350 |
| 6,026,795 | A |   | 2/2000 | Poggio et al. ............ 123/695 |
| 6,109,244 | A | * | 8/2000 | Yamamoto et al. .......... 123/478 |
| 6,123,056 | A | * | 9/2000 | Shimada et al. ........... 123/399 |
| 6,273,056 | B1 | * | 8/2001 | Shirakawa et al. ......... 123/305 |
| 6,360,733 | B1 | * | 3/2002 | Uberti Bona Blotto et al. ........... 123/674 |
| 6,397,817 | B1 | * | 6/2002 | Yoshida et al. ......... 123/406.47 |
| 6,513,485 | B2 | * | 2/2003 | Ogawa et al. ............. 123/295 |
| 6,612,292 | B2 |   | 9/2003 | Shirakawa ................ 123/501 |
| 6,857,414 | B2 |   | 2/2005 | Ogawa et al. ............. 123/295 |
| 6,912,989 | B2 |   | 7/2005 | Tayama et al. ........... 123/276 |
| 6,968,267 | B2 |   | 11/2005 | Sautto ..................... 701/103 |

(Continued)

FOREIGN PATENT DOCUMENTS

JP          200027694        1/2000

*Primary Examiner*—Michael Cuff
*Assistant Examiner*—Hung Q Nguyen
(74) *Attorney, Agent, or Firm*—Baker Botts L.L.P.

(57) ABSTRACT

Combustion control of a diesel engine is achieved, such that the engine has a monotonic relation between intake manifold pressure and engine torque. For a given engine speed, fuel injection parameters are primarily determined by intake manifold pressure. However, the determination of the fuel injection parameters is also secondarily based on correction factors such as oxygen concentration, intake manifold temperature, and coolant temperature. In effect, the fuel injection parameters reflect the in-cylinder gas mass.

24 Claims, 7 Drawing Sheets

U.S. PATENT DOCUMENTS

| | | |
|---|---|---|
| 7,051,714 B2 | 5/2006 | La Rosa et al. ............. 123/446 |
| 7,163,007 B2 | 1/2007 | Sasaki et al. ................ 123/673 |
| 2007/0089720 A1* | 4/2007 | Takahashi ................... 123/687 |

* cited by examiner

COMBUSTION CONTROL SYSTEM BASED ON IN-CYLINDER CONDITION

TECHNICAL FIELD OF THE INVENTION

This invention relates to engine control systems, and more particularly to an engine control system that controls fuel injection on the basis of in-cylinder conditions.

BACKGROUND OF THE INVENTION

The diesel engine is an internal combustion engine that uses compression ignition, in which fuel ignites as it is injected into air in a combustion chamber. More specifically, in a diesel engine, air is drawn into the cylinders and is compressed by the cylinder pistons. Near the end of the compression stroke, diesel fuel is injected into the combustion chamber. The fuel ignites from contact with the air, which due to compression has been heated to a temperature of about 1300-1650° F. The resulting combustion causes increased heat and expansion in the cylinder, which increases pressure in the cylinder and moves the piston downward. A connecting rod transmits this motion to a crankshaft to convert linear motion to rotary motion for use as power in a variety of applications.

Intake air to the engine is usually controlled by mechanical valves in the cylinder head. For increased power output, most modern diesel engines have a turbocharger, and some have a supercharger to increase intake air volume. Use of an aftercooler/intercooler to cool intake air that has been compressed, and thus heated, by the turbocharger increases the density of the air and leads to power and efficiency improvements.

Today's conventional diesel engine control systems are "fuel based". An engine control unit determines the quantity of fuel to inject. Downward action of the throttle pedal causes the engine control unit to inject more fuel.

Typical fuel based engine control methods do not result in combustion that is sensitive to in-cylinder conditions. In particular, the combustion is not sensitive to airflow mass, air fuel ratio, or exhaust gas recirculation (EGR) rate. For some modern diesel engines, fuel injection is adjusted based on airflow mass measurement to control soot in small regions of the operating range, but this control method is still primarily fuel-based.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to an engine control method, with fuel delivery (typically direct injection into the cylinder) controlled by a predicted in-cylinder condition. The in-cylinder condition (as the basis for fueling) is mostly predicted from engine speed and intake manifold (boost) pressure, and used to derive base fueling values. Then, for optimal combustion, several other parameters are used as correcting factors. These correcting factors include coolant temperature, intake manifold temperature, and intake manifold oxygen (O2) concentration (calculated from airflow mass).

The relation between the above-described control parameters (engine speed, intake manifold pressure, and correcting factors) and fueling parameters (quantity, pressure, number of injections, and timing) may be implemented as multidimensional lookup tables or functions. A control system implementing this method may be referred to as an "intake manifold pressure based multivariable control system".

Figure 1:
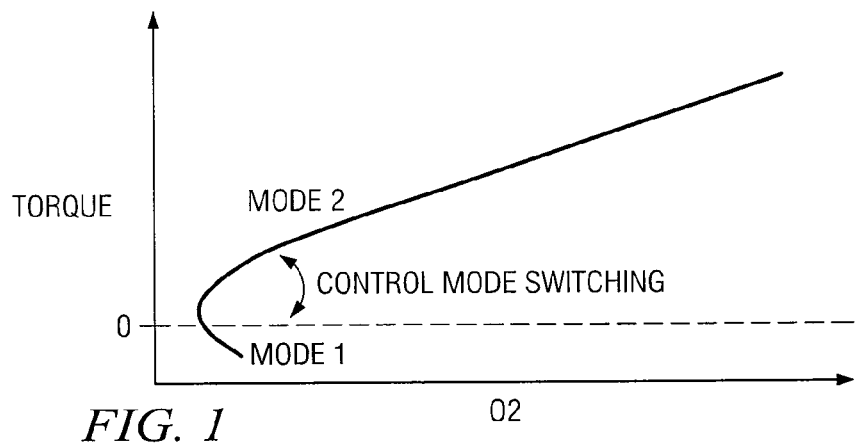
FIG. 1 illustrates the relationship between engine torque and 02 for optimal combustion.

FIG. 1 illustrates the relationship between torque and intake manifold oxygen (O2) concentration for optimal combustion. Engine torque increases with increasing O2 for most of the engine operating region. However, at the very low end, mainly in the negative torque area, O2 must increase while the engine torque decreases. This is necessary to maintain combustion stability. As a result, there are two suitable torque points for a given O2 content.

Intake Manifold Pressure Based Control

Figure 2:
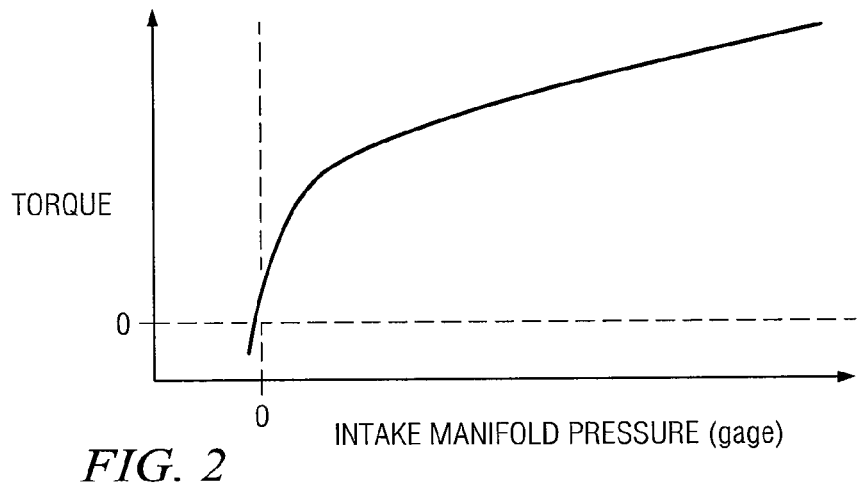
FIG. 2 illustrates the relationship between engine torque and intake manifold pressure using the control method described herein.

FIG. 2 illustrates the relationship of torque and intake manifold pressure using the control method described herein. The relation between intake manifold pressure and torque is monotonic. In other words, torque increases with increasing intake manifold pressure. Choosing intake manifold pressure instead of O2 as the control parameter allows realizing this monotonic relationship.

Figure 3:
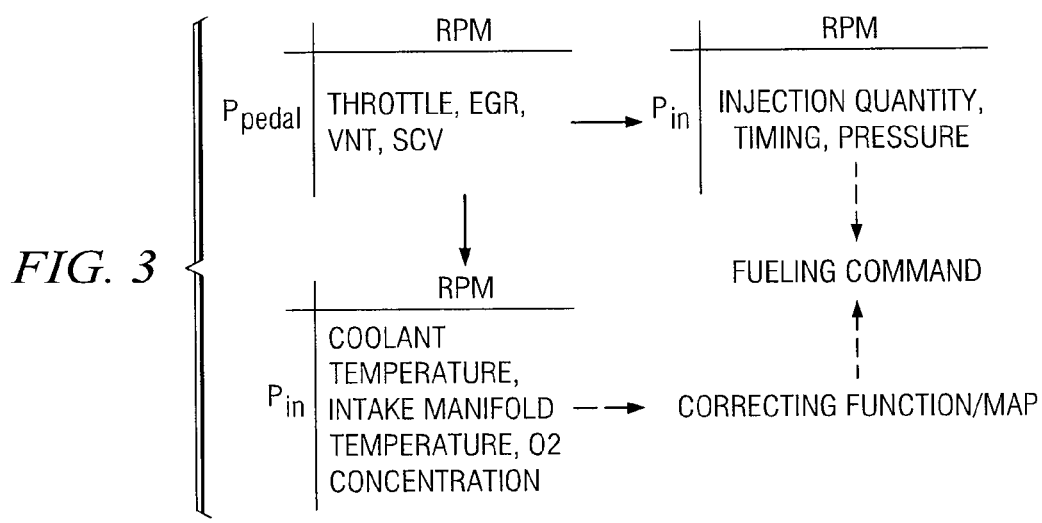
FIG. 3 illustrates how various base maps are used to generate fueling commands.

FIG. 3 illustrates how various base maps are used to generate fueling commands. Steady state tests may be used to derive these base maps.

A first base map defines actuator positions of air handling devices in terms of engine speed (rpm) and acceleration pedal position ($P_{pedal}$). These actuator positions may include throttle position, EGR valves, variable nozzle turbocharger (VNT) position, and swirl control valve (SCV).

A second base map defines fueling parameters in terms of engine speed and intake manifold pressure. These fueling parameters include fuel injection quantity, injection timing, number of injections, and injection pressure. These fueling parameters are represented in commands delivered to associated fuel handling devices within the engine system.

A third base map defines various other physical quantities that affect combustion (coolant temperature, intake manifold temperature, intake manifold O2 concentration) as a function of engine speed and intake manifold pressure. As explained below, this information is used to modify base fueling maps during conditions where these other physical quantities depart from their respective steady state values.

Correcting Factors

At a given engine speed, the intake manifold pressure is almost proportional to the total in-cylinder gas mass. Thus, the total mass of in-cylinder gas (fresh air and EGR gas) is predictable from intake manifold pressure, if account is taken of the effect of temperature (intake manifold temperature and coolant temperature) at each engine speed. This prediction assumes that these two temperatures affect volumetric efficiency at a given engine speed.

The intake manifold temperature, coolant temperature, and intake manifold pressure may all be measured. These measurements can be used to predict total in-cylinder gas mass before a fuel injection event.

Under steady state conditions, factors that affect combustion (O2 concentration, intake manifold temperature, coolant temperature) are also in steady state, and thus are implicitly accounted for in optimizing combustion. The steady state values for these factors can be expressed as functions of engine speed and intake manifold pressure. During transient conditions, however, these factors assume values independent of intake manifold pressure and engine speed, and affect combustion. In the control method described herein, these factors are understood as correction factors, and are used to adjust control values for the fuel injection event.

Correction Factors; O2 Concentration

In transient conditions, the O2 concentration is affected by preceding cycles and differs from its steady state value (at the same intake manifold pressure). Stated differently, in transient conditions, the O2 mass and inert gas mass ratio in-cylinder is different (at a given intake pressure), and the air fuel ratio of combustion products will be different, as compared to steady state conditions.

For example, if the fuel was cut during preceding cycles, a high EGR rate could result in a high O2 concentration. In this situation, fuel injection parameters based solely on intake manifold pressure (steady state information) would result in fast and noisy combustion.

On the other hand, if the O2 concentration of preceding cycles was lower than steady state, combustion would be slower and perhaps unstable.

To account for deviations from steady state conditions (and to thereby maintain acceptable combustion), the fuel injection event should be controlled based on the reference (steady state) map, as well as actual O2 concentrations at the given intake manifold pressure and engine speed.

Figure 4:
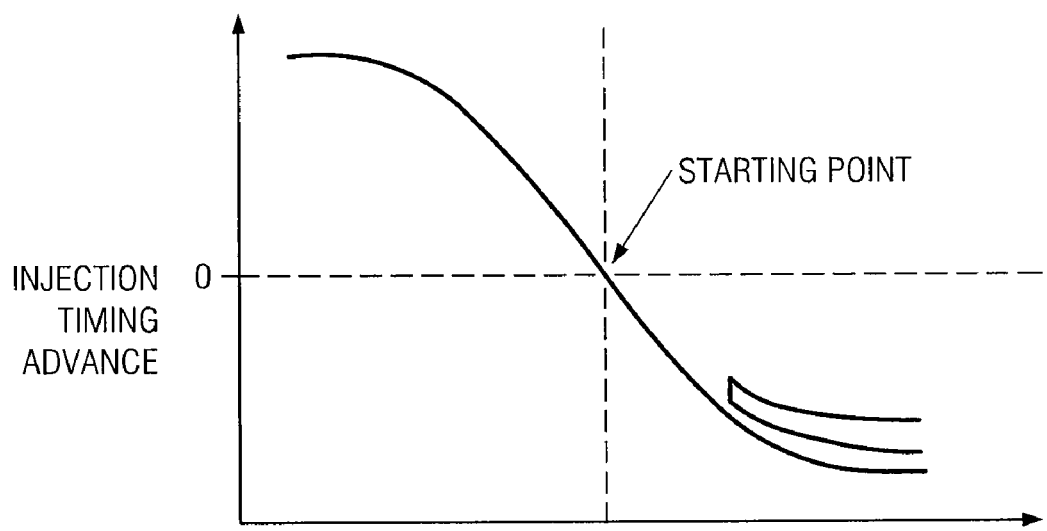
FIG. 4 illustrates one example of how fuel injection timing is corrected on the basis of O2 concentration.

FIG. 4 illustrates one example of how fuel injection timing is corrected on the basis of O2 concentration. In this case, the injection timing is advanced as the O2 concentration reduces.

Figure 5:
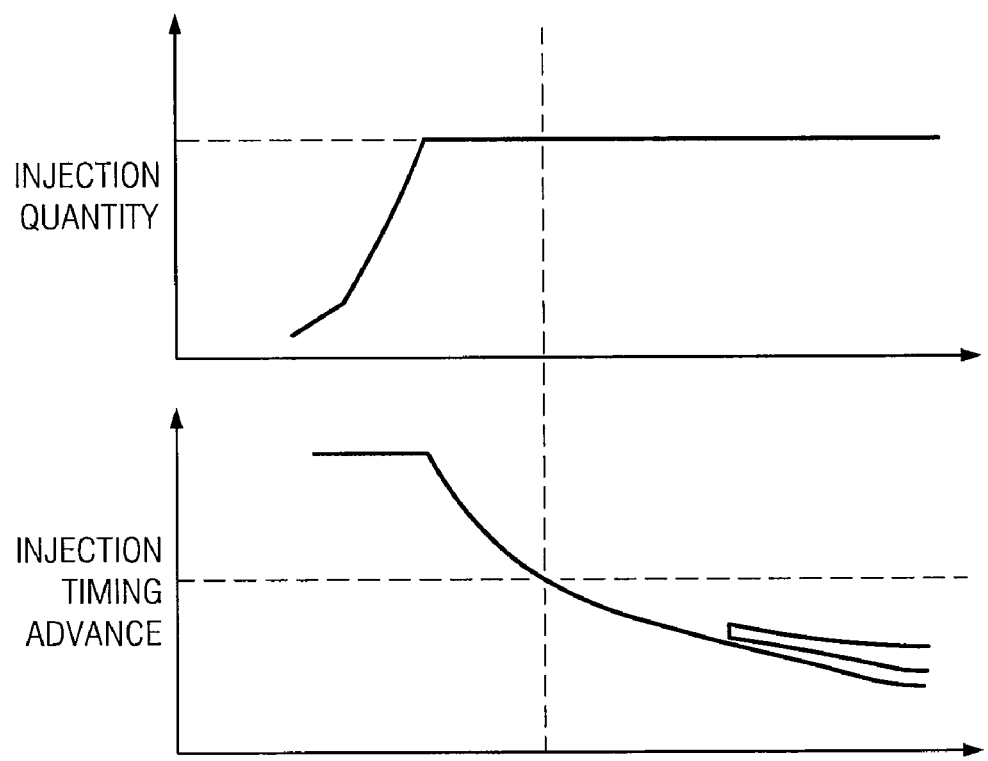
FIG. 5 illustrates a refinement of fuel injection timing and fuel quantity correction, based on O2 concentration.

FIG. 5 illustrates a refinement of fuel injection timing and fuel injection quantity correction, based on O2 concentration. In this case, as the O2 concentration decreases, injection timing is advanced until it can be advanced no further (the maximally advanced timing). The maximum advance is limited by the relation between the fuel spray pattern and the combustion chamber geometry. After reaching the boundary of injection timing, the fuel quantity is reduced.

As yet another refinement, when the O2 concentration is very high, a double injection pattern could be applied instead of late single injection to reduce combustion noise.

Correcting Factors; Intake Manifold Temperature

Combustion is also affected by the intake manifold temperature, which in turn is affected by the preceding cycles in transient conditions.

Figure 6:
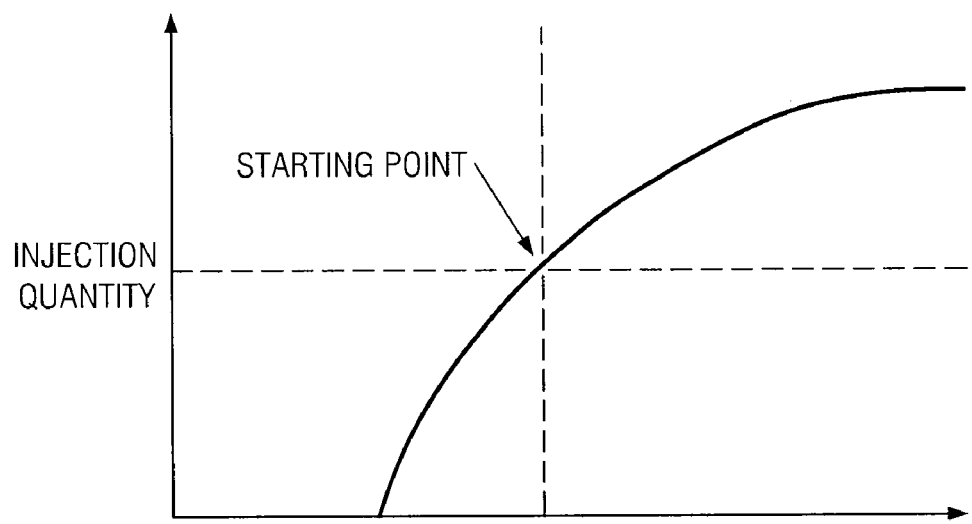
FIGS. 6, 7, and 8 are three examples of how fuel injection can be corrected based on the departure of intake manifold temperature from its steady state value.
Figure 7:
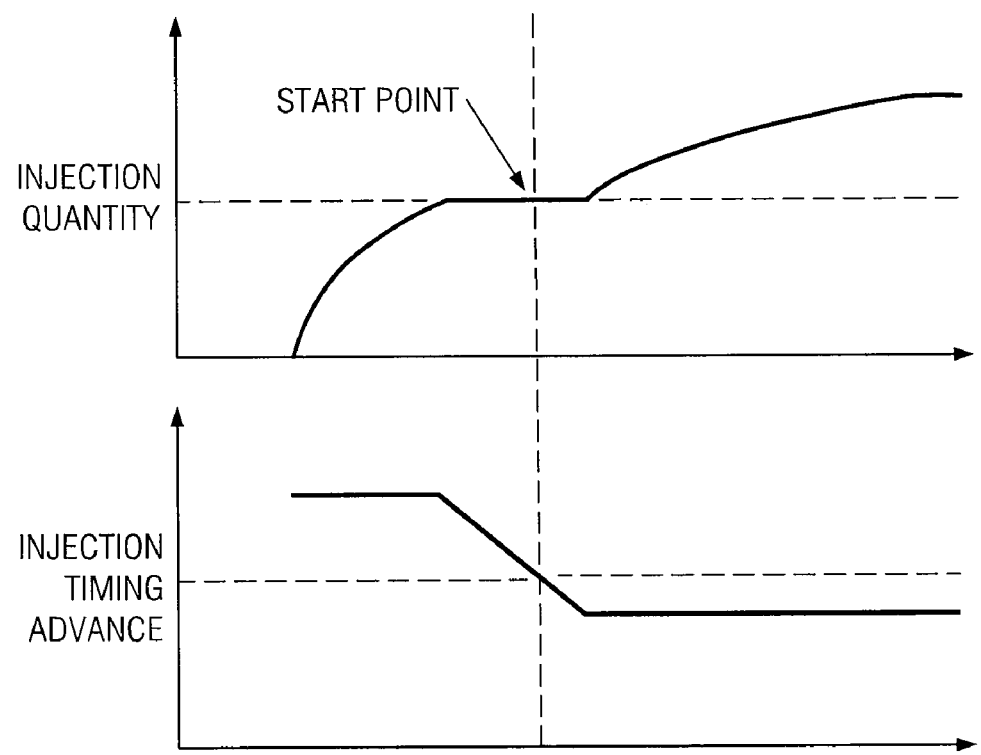
Figure 8:
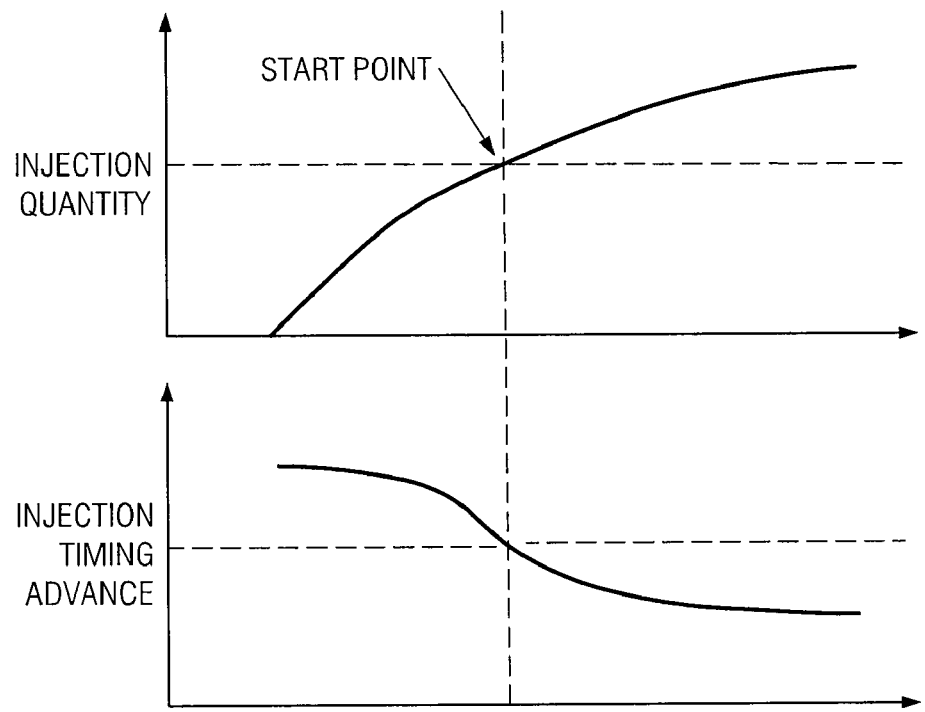

FIGS. 6, 7, and 8 are the three examples of how fuel injection can be corrected based on the departure of the intake manifold temperature (Tin) from its reference (steady state) values. Generally speaking, combustion speed slows down as the intake manifold temperature deceases. Thus, when the intake manifold temperature is lower than the reference, the injection timing should be advanced and/or the injection quantity reduced (to increase air fuel ratio) to maintain acceptable combustion character.

In FIG. 6, only injection quantity is adjusted. In FIG. 7, both injection quantity and timing are adjusted (injection timing and quantity are adjusted in that order). FIG. 8 illustrates that parallel adjustment of injection timing and quantity is also possible.

Correcting Factors; Coolant Temperature

The effect of coolant temperature on combustion is similar to that of the intake manifold temperature. Therefore, corrective actions similar to those of FIGS. 6, 7, and 8 may be taken.

Multivariable Control Model

As is clear from above, at least five in-cylinder control inputs affect combustion: engine speed, intake manifold pressure, intake manifold O2 concentration, intake manifold temperature, and coolant temperature. These control inputs are used to derive fueling parameters, such as injection quantity and injection timing (pilot and main) and injection pressure.

Figure 9:
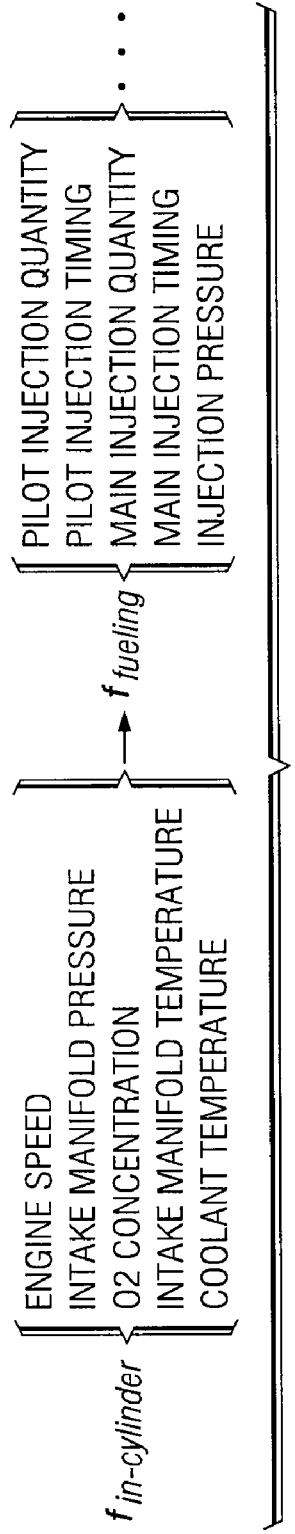
FIG. 9 illustrates a general form of functional dependence of control inputs for desired combustion.

FIG. 9 illustrates a general form of functional dependence of control inputs for desired combustion. For modeling the control system, to reduce model complexity, the independent control inputs may be separated into primary (engine speed, intake manifold pressure) and secondary (intake manifold O2 concentration, intake manifold temperature, and coolant temperature). The base model then becomes simple, and the effect of the secondary inputs is accounted for by successive corrections.

The model used to obtain the control system is based on physical observation of the combustion process and is described further below. As an alternative, a purely mathematical (statistical) model can be constructed and is also described below. It should be noted that a good solution is normally obtained by combining statistical and physical modeling approaches.

Statistical Modeling

As a general rule, two kinds of errors must be considered when constructing a multi-dimensional mathematical model, such as the five-input five-output model of this description. The first is "bias", which is a result of the structure of the model. The other is "variance error", which results from the deviation of the estimated model parameters from their respective optimal values (once the model structure is selected). Generally speaking, the "bias" decreases and "variance error" increases as the number of independent model parameters grows.

The following steps can be taken to build a candidate mathematical model:

1. Identify unreachable regions of the input space (5-dimensional).
2. Identify any regions of the input space where the rank drops, i.e., where inputs are redundant.
3. Four different kinds of models can be tried:
   a. Radial-basis function series linear in model parameters (could be nonlinear in inputs).
   b. A local linear model tree structure with a partition of unity.
   c. Projection-based structure (similar in spirit to recognizing Tcomb, explained below). The intent here is to reduce the effective number of inputs.

d. Additive/multiplicative/hierarchical structure.

As is clear from Items 1 and 2 above, the engine must be operated through the input space, such that there is no apparent drop in the rank from the data collected to build the model. During data collection, guidance may be sought from established methods from the field of statistical design of experiments. This will involve "normal" engine operation as well as "offset" engine operation at low/high temperatures and O2 concentrations.

Physical Modeling

Figure 10:
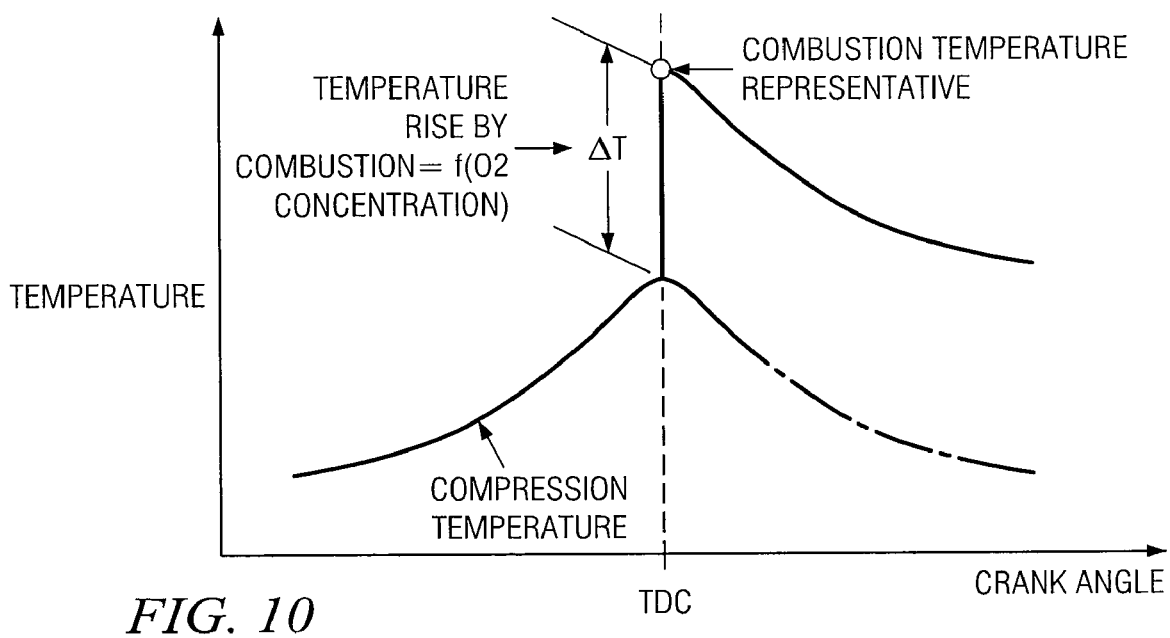
FIG. 10 illustrates a combustion temperature index (Tcomb), which is a function of three independent inputs: intake temperature, coolant temperature, and intake O2 concentration.

FIG. 10 illustrates a combustion temperature index (Tcomb), which is a function of three independent inputs: intake temperature, coolant temperature, and intake O2 concentration. This index is part of the in-cylinder condition prior to fuel injection.

The combustion temperature index is calculated as follows:

1) For each engine speed, a function to calculate compression temperature can be made theoretically and/or empirically. Generally, the compression temperature will depend on the intake manifold and coolant temperatures.

2) Temperature rise by combustion can be calculated from in-cylinder O2 concentration, assuming that the air-fuel ratio at combustion portion is stoichiometric.

Figure 11:
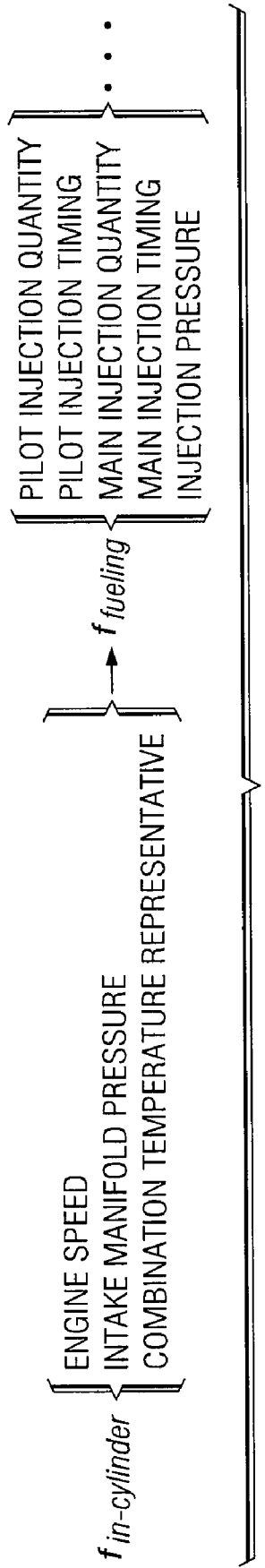
FIG. 11 illustrates how, by calculating combustion temperature, the functional expression of FIG. 9 can be simplified.

FIG. 11 illustrates how, by calculating the combustion temperature in this manner, the functional expression of FIG. 9 can be modified.

Figure 12:
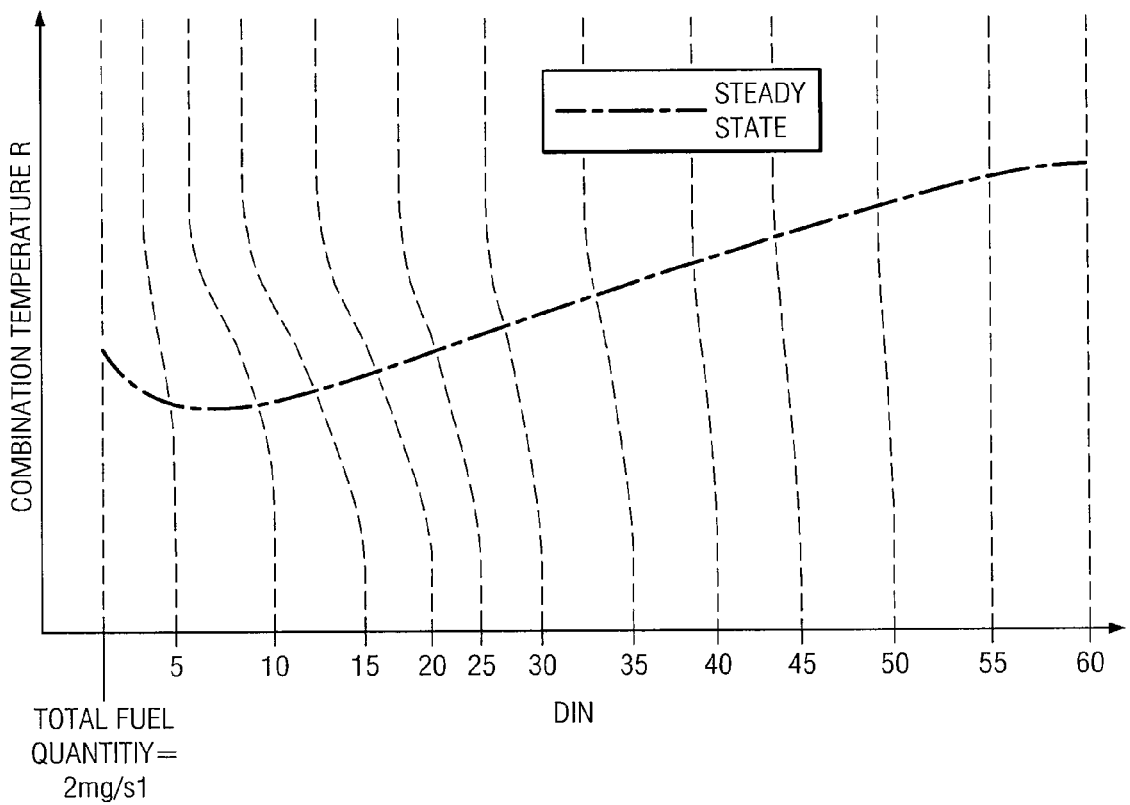
FIGS. 12 and 13 illustrate a fuel injection quantity correction map and a fuel injection timing correction map, respectively.
Figure 13:
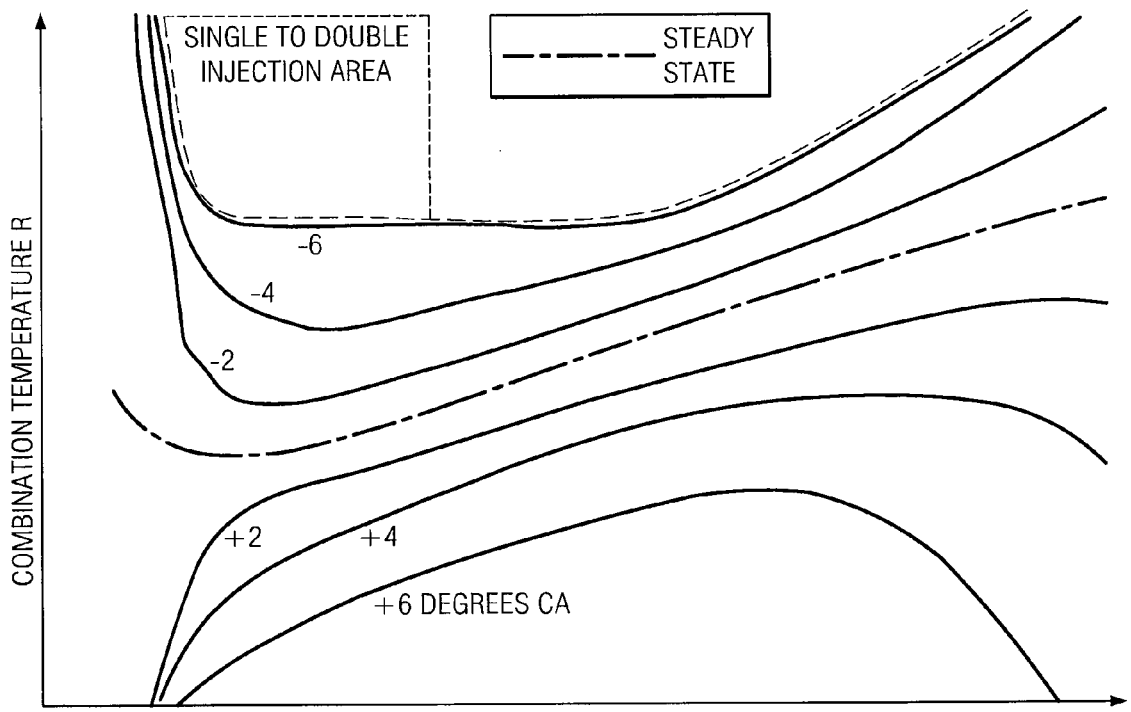

FIGS. 12 and 13 illustrate a fuel injection quantity correction map and a fuel injection timing correction map, respectively. These maps are based on the function of FIG. 11, and constructed from test data taken at "offset" conditions of O2 concentration, intake manifold and coolant temperatures. As illustrated, the corrections to injection quantity and injection timing are smaller at very low and high loads. This is generally due to the fact that EGR rates at very low and high loads are low to achieve combustion stability and reduce smoke, respectively.

Control Method

Figure 14:
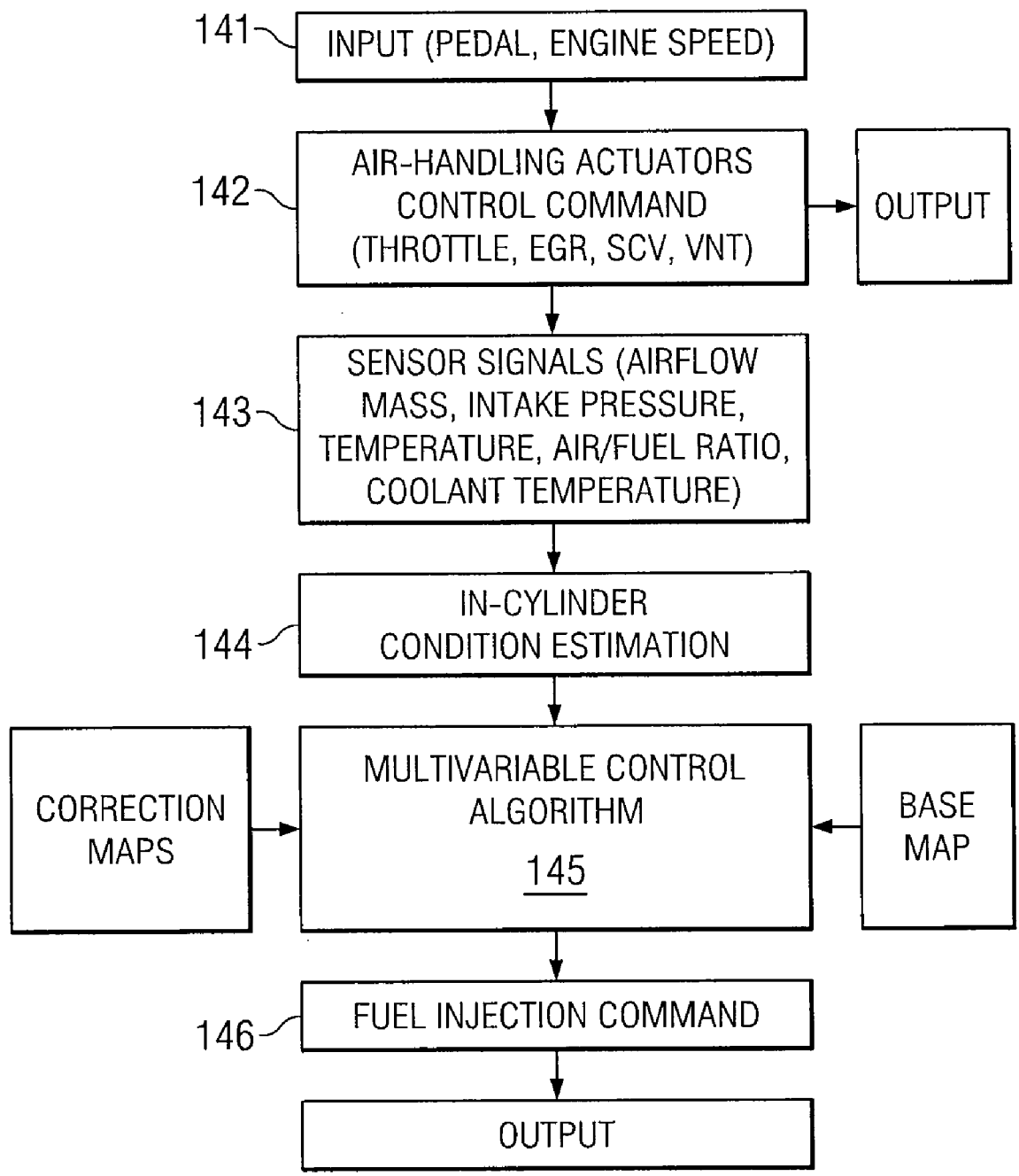
FIG. 14 illustrates a method for controlling combustion in accordance with the teachings described herein.

FIG. 14 illustrates a method for controlling combustion in accordance with the above-described teachings. This method may be implemented with appropriate hardware and software in the form of an engine control unit. This engine control unit may be a dedicated system or part of a more comprehensive system for control of the engine and associated systems.

In Step 141, the driver acceleration pedal position and engine speed are measured. In Step 142, values for controlling air handling actuators (throttle, EGR valve, VNT, etc.) are directly determined from pedal and engine speed.

In Step 143, other measurements, such as the fresh airflow, intake manifold pressure, intake manifold temperature, and exhaust gas air-fuel ratio are made. Appropriate sensors send measurement signals to the control unit.

In Step 144, the in-cylinder condition (total gas mass (fresh air plus EGR gas), O2 concentration, and inert gas concentration) is estimated.

In Step 145, the estimated in-cylinder condition, along with the steady state base maps and the correction map determine the fuel injection command as a genuine multivariable calculation. As explained above, the base maps are derived from engine speed, pedal position, and intake manifold pressure. The correction map is based on coolant temperature, intake manifold temperature, and O2 concentration.

In Step 146, a fuel injection command is delivered to appropriate actuators.

Some significant features of the method of FIG. 14 are:

(1) The engine has a monotonic relation between intake manifold pressure and engine torque (they increase and decrease together).

(2) Fuel injection parameters are determined by intake manifold pressure for a given engine speed.

(3) Fuel injection parameters are adjusted by at least one of the correcting factors: O2 concentration, intake manifold temperature, coolant temperature.

(4) The statistical control model is a genuine multivariable model (with possible projection structure) for reduced complexity.

(5) Overall, the fuel injection parameters are decided from total gas mass in-cylinder calculated from intake manifold pressure and one physical value (combustion temperature index=f(O2 concentration, intake manifold temperature, coolant temperature).

(6) For the base cases where EGR rate (map on engine speed and intake manifold pressure) is low, the corresponding corrections are low, that is, the limits on correction depend on the EGR rate.

What is claimed is:

1. A method of controlling fuel delivered to a diesel engine, comprising:
   storing a first base map that defines values for control of an air handling actuator in terms of engine speed and acceleration pedal position;
   storing a second base map that defines values for control of a fueling parameter in terms of engine speed and intake manifold pressure;
   storing a correction map that defines values for a correction factor in terms of intake manifold pressure and combustion temperature;
   wherein the combustion temperature is determined on the basis of at least one or more of the following correction factors: coolant temperature, intake manifold temperature, and intake manifold oxygen concentration;
   receiving values representing pedal position and engine speed;
   in response to the preceding step, using the first base map to determine at least one air handling actuator control value;
   receiving values representing the intake manifold pressure and at least one of the correction factors; and
   in response to the preceding step, calculating the combustion temperature, and using the second base map and the correction map to generate at least one fueling control value.

2. The method of claim 1, wherein the air handling actuator control value is associated with at least one of the following group of actuators: throttle, exhaust gas recirculation valve, turbocharger output, and swirl control valve.

3. The method of claim 1, further comprising repeating the steps of storing a first base map and of using the first base map to determine an air handling actuator control value, for more than one air handling actuator.

4. The method of claim 1, wherein the fueling control value is selected from the following group: fuel injection quantity, injection timing, number of injections, and injection pressure.

5. The method of claim 1, further comprising repeating the steps of storing a second base map and of using the second base map to generate a fueling control value, for more than one fueling control value.

6. The method of claim 1, further comprising the steps of determining the EGR rate associated with the engine and of adjusting the fueling control value based on the EGR rate.

7. The method of claim 1, wherein the correction factor is intake manifold oxygen concentration, the fueling control value is an injection timing command, and the correction map is used to adjust injection timing.

8. The method of claim 1, wherein the correction factor is intake manifold oxygen concentration, the fueling control value is an injection quantity command, and the correction map is used to adjust injection quantity.

9. The method of claim 1, wherein the correction factor is intake manifold temperature, the fueling control value is an injection timing command, and the correction map is used to adjust injection timing.

10. The method of claim 1, wherein the correction factor is intake manifold temperature, the fueling control value is an injection quantity command, and the correction map is used to adjust injection quantity.

11. The method of claim 1, wherein the correction factor is coolant temperature, the fueling control value is an injection timing command, and the correction map is used to adjust injection timing.

12. The method of claim 1, wherein the correction factor is coolant temperature, the fueling control value is an injection quantity command, and the correction map is used to adjust injection quantity.

13. A controller for controlling fuel delivered to a diesel engine, comprising:

Memory for storing a first base map that defines values for control of an air handling actuator in terms of engine speed and acceleration pedal position; storing a second base map that defines values for control of a fueling parameter in terms of engine speed and intake manifold pressure; storing a correction map that defines values for a correction factor in terms of intake manifold pressure and combustion temperature;

wherein the combustion temperature is determined on the basis of at least one or more of the following correction factors: coolant temperature, intake manifold temperature, and intake manifold oxygen concentration;

a processing device in data communication with the memory and programmed to receive values representing pedal position and engine speed; in response to the preceding step, use the first base map to determine at least one air handling actuator control value; receive values representing the intake manifold pressure and at least one of the correction factors; and in response to the preceding step, calculate the combustion temperature, and use the second base map and the correction map to generate at least one fueling control value.

14. The controller of claim 13, wherein the air handling actuator control value is associated with at least one of the following group of actuators: throttle, exhaust gas recirculation valve, turbocharger output, and swirl control valve.

15. The controller of claim 13, further comprising repeating the steps of storing a first base map and of using the first base map to determine an air handling actuator control value, for more than one air handling actuator.

16. The controller of claim 13, wherein the fueling control value is selected from the following group: fuel injection quantity, injection timing, number of injections, and injection pressure.

17. The controller of claim 13, further comprising repeating the steps of storing a second base map and of using the second base map to generate a fueling control value, for more than one fueling control value.

18. The controller of claim 13, further comprising the steps of determining the EGR rate associated with the engine and of adjusting the fueling control value based on the EGR rate.

19. The controller of claim 13, wherein the correction factor is intake manifold oxygen concentration, the fueling control value is an injection timing command, and the correction map is used to adjust injection timing.

20. The controller of claim 13, wherein the correction factor is intake manifold oxygen concentration, the fueling control value is an injection quantity command, and the correction map is used to adjust injection quantity.

21. The controller of claim 13, wherein the correction factor is intake manifold temperature, the fueling control value is an injection timing command, and the correction map is used to adjust injection timing.

22. The controller of claim 13, wherein the correction factor is intake manifold temperature, the fueling control value is an injection quantity command, and the correction map is used to adjust injection quantity.

23. The controller of claim 13, wherein the correction factor is coolant temperature, the fueling control value is an injection timing command, and the correction map is used to adjust injection timing.

24. The controller of claim 13, wherein the correction factor is coolant temperature, the fueling control value is an injection quantity command, and the correction map is used to adjust injection quantity.

* * * * *